(12) United States Patent
Brokish

(10) Patent No.: US 7,191,445 B2
(45) Date of Patent: Mar. 13, 2007

(54) METHOD USING EMBEDDED REAL-TIME ANALYSIS COMPONENTS WITH CORRESPONDING REAL-TIME OPERATING SYSTEM SOFTWARE OBJECTS

(75) Inventor: Charles W. Brokish, Columbia County, WI (US)

(73) Assignee: Texas Instruments Incorporated, Dallas, TX (US)

( * ) Notice: Subject to any disclaimer, the term of this patent is extended or adjusted under 35 U.S.C. 154(b) by 629 days.

(21) Appl. No.: 10/157,617

(22) Filed: May 29, 2002

(65) Prior Publication Data

US 2003/0046614 A1 Mar. 6, 2003

Related U.S. Application Data

(60) Provisional application No. 60/316,524, filed on Aug. 31, 2001.

(51) Int. Cl.
G06F 9/46 (2006.01)
G06F 9/44 (2006.01)
G06F 11/00 (2006.01)

(52) U.S. Cl. .................. 718/102; 717/124; 714/25
(58) Field of Classification Search ........ 718/100–104; 717/124; 714/25
See application file for complete search history.

(56) References Cited

U.S. PATENT DOCUMENTS

| 5,283,900 | A | | 2/1994 | Frankel et al. ............. 395/700 |
|---|---|---|---|---|
| 5,392,448 | A | | 2/1995 | Frankel et al. ............. 395/800 |
| 5,450,586 | A | * | 9/1995 | Kuzara et al. ............. 717/124 |
| 5,828,824 | A | * | 10/1998 | Swoboda ..................... 714/25 |
| 5,838,692 | A | * | 11/1998 | Tobin ......................... 714/724 |
| 6,249,909 | B1 | * | 6/2001 | Russo et al. ............... 717/100 |
| 6,266,754 | B1 | * | 7/2001 | Laczko et al. ............. 711/203 |

* cited by examiner

Primary Examiner—Meng-Al T. An
Assistant Examiner—Camquy Truong
(74) Attorney, Agent, or Firm—Robert D. Marshall, Jr.; W. James Brady; Frederick J. Telecky, Jr.

(57) ABSTRACT

An operating system (OS) is used in a system with a processor that includes embedded real-time analysis components. The OS includes software objects which provide functionality in response to signals from the embedded real-time analysis components. In an example embodiment, the OS is a real-time OS (RTOS), the embedded real-time analysis components include an embedded event trigger component, and the software objects include a debug object that responds to signals from the embedded event trigger component. For instance, those signals may relate to program flow, data flow, or a hardware operation such as a cache miss, and the debug object may be a breakpoint handler, a trace handler, or an event sequence handler. In the example embodiment, the software objects in the RTOS provide functionality such as stack overflow detection, real-time task priority modification, and/or system scheduling error assertion for a real-time application. Alternative embodiments involve related methods and systems.

11 Claims, 3 Drawing Sheets

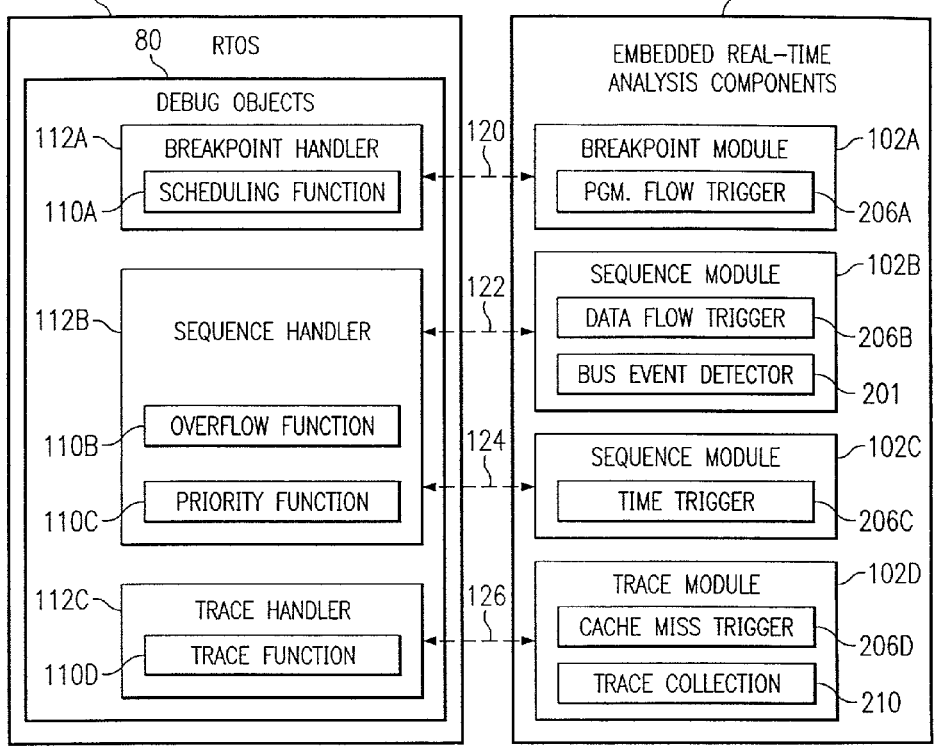
FIG. 3
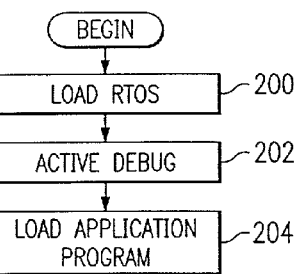
FIG. 4
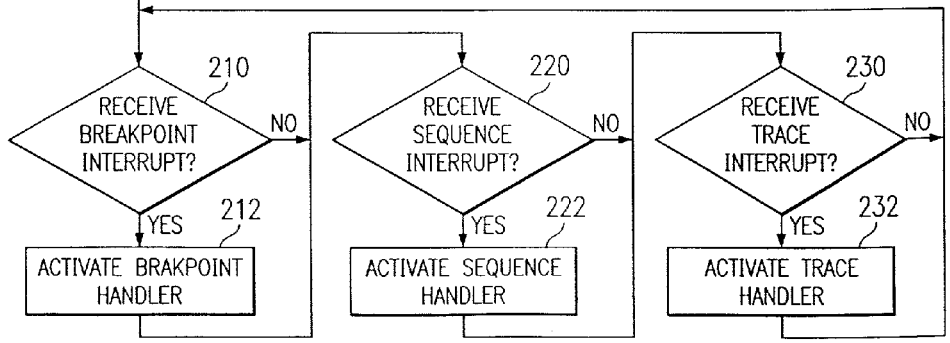

METHOD USING EMBEDDED REAL-TIME ANALYSIS COMPONENTS WITH CORRESPONDING REAL-TIME OPERATING SYSTEM SOFTWARE OBJECTS

This application claims priority under 35 USC §(e)(1) of Provisional Application No. 60/316,524, filed Aug. 31, 2001.

CROSS REFERENCE TO RELATED APPLICATION

Copending U.S. patent application Ser. No. 09/798,173, entitled "System and Method for Automatically Configuring a Debug System," now U.S. Pat. No. 6,785,850, assigned to the assignee of the present application, is hereby incorporated herein by reference.

TECHNICAL FIELD OF THE INVENTION

This invention relates in general to data processing systems. In particular, this invention relates to systems and methods for using embedded real-time analysis components of processors such as digital signal processors.

BACKGROUND OF THE INVENTION

Computer operating systems are resident on nearly every computer and are typically required to run application software. Certain data processing jobs require large amounts of mathematical processing and specialized digital signal processing algorithms. Processing hardware units known as digital signal processors (DSPs) and software applications known as real-time programs or real-time applications have been developed to handle such jobs. Specialized operating systems, known as real-time operating systems (RTOSs), have been developed to facilitate the development of real-time applications for DSPs. An example of such an RTOS is described in U.S. Pat. No. 5,392,448.

The challenges faced by developers of real-time programs include challenges relating to program verification and troubleshooting. Program verification and trouble shooting are referred to generally as "debugging." When debugging a real-time program, the developer typically uses a separate host system, such as a personal computer (PC), to retrieve data from the DSP repeatedly during execution of the real-time program to track changes over time. The data retrieved by the developer typically includes values from numerous program variables, timing parameters, system stacks, etc. The process of acquiring data to debug a real-time program is known as real-time analysis.

Since real-time programs typically perform jobs requiring real-time response, it is important for the real-time analysis to interfere as little as possible with the operations of the real-time program being analyzed. For example, the data to be examined should be acquired while the application is running, with minimal intrusion on the system. Intrusion may be in terms of space, in that the techniques for debugging the program may take up memory space, or in terms of time, in that the steps required for debugging the program may consume cycles in the DSP's central processing unit (i.e., the CPU core). A disadvantage associated with traditional tools for real-time analysis is that they interfere with the programs being analyzed by consuming cycles in the CPU core and occupy system memory space.

In response to the need for more effective means for performing real-time analysis, Texas Instruments Incorporated has designed certain processors to include special hardware known as embedded debug components. For example, U.S. Pat. No. 6,785,850 describes an example DSP with debug components which allow the DSP to perform functions for real-time analysis without consuming cycles in the CPU core or memory space needed for application programs. Embedded debug components may also be called embedded real-time analysis components or embedded emulation components (EECs). They may also be simply called debug components.

DSPs that feature embedded debug components can be debugged much more effectively than DSPs without embedded debug components, since embedded debug components reduce or eliminate interference between the real-time analysis functions and the application programs executing on the DSP. Embedded debug components thus help developers overcome some of the challenges associated with designing and verifying real-time programs for processors such as DSPs. As recognized by the present invention, however, additional benefits could be realized by further developing technologies for using embedded debug components in processors such as DSPs.

SUMMARY OF THE INVENTION

One aspect of the invention is an operating system (OS) for use in a system with a processor that includes embedded real-time analysis components. The OS includes software objects which provide functionality in response to signals from the embedded real-time analysis components.

A detailed description is provided for an example embodiment. In the example embodiment, the OS is a real-time operating system (RTOS), the embedded real-time analysis components include an embedded event trigger component, and the software objects in the RTOS include a debug object that responds to signals from the embedded event trigger component. For instance, those signals may relate to program flow, data flow, or hardware operations such as cache misses, and the debug object may be a breakpoint handler, a trace handler, or an event sequence handler.

In the example embodiment, the software objects in the RTOS provide functionality such as stack overflow detection, real-time task priority modification, and/or system scheduling error assertion for a real-time application. Alternative embodiments involve related methods and systems.

An advantage of OSs according to the example embodiment is that they provide hardware support for functions such as stack overflow detection, real-time task priority modification, and/or system scheduling error assertion. A device which utilizes an OS according to the example embodiment can therefore provide a higher level of service. For example, such an OS makes it possible to capture events that would otherwise be non-detectable or require additional software content and CPU use. Another advantage is that the example embodiment can perform functions for the real-time operating system without taking consuming valuable processing time from that real-time operating system, thus allowing the device to accomplish more processing within the allotted time.

BRIEF DESCRIPTION OF THE DRAWINGS

The present invention and its numerous objects, features, and advantages may be better understood by reference to the following description of an example embodiment and the accompanying drawings, in which:

FIG. 3 is a block diagram depicting example logical relationships between embedded real-time analysis components and debug objects; and FIG. 4 is a flowchart of an example process for using embedded real-time analysis components.

DETAILED DESCRIPTION OF AN EXAMPLE EMBODIMENT

Figure 1:
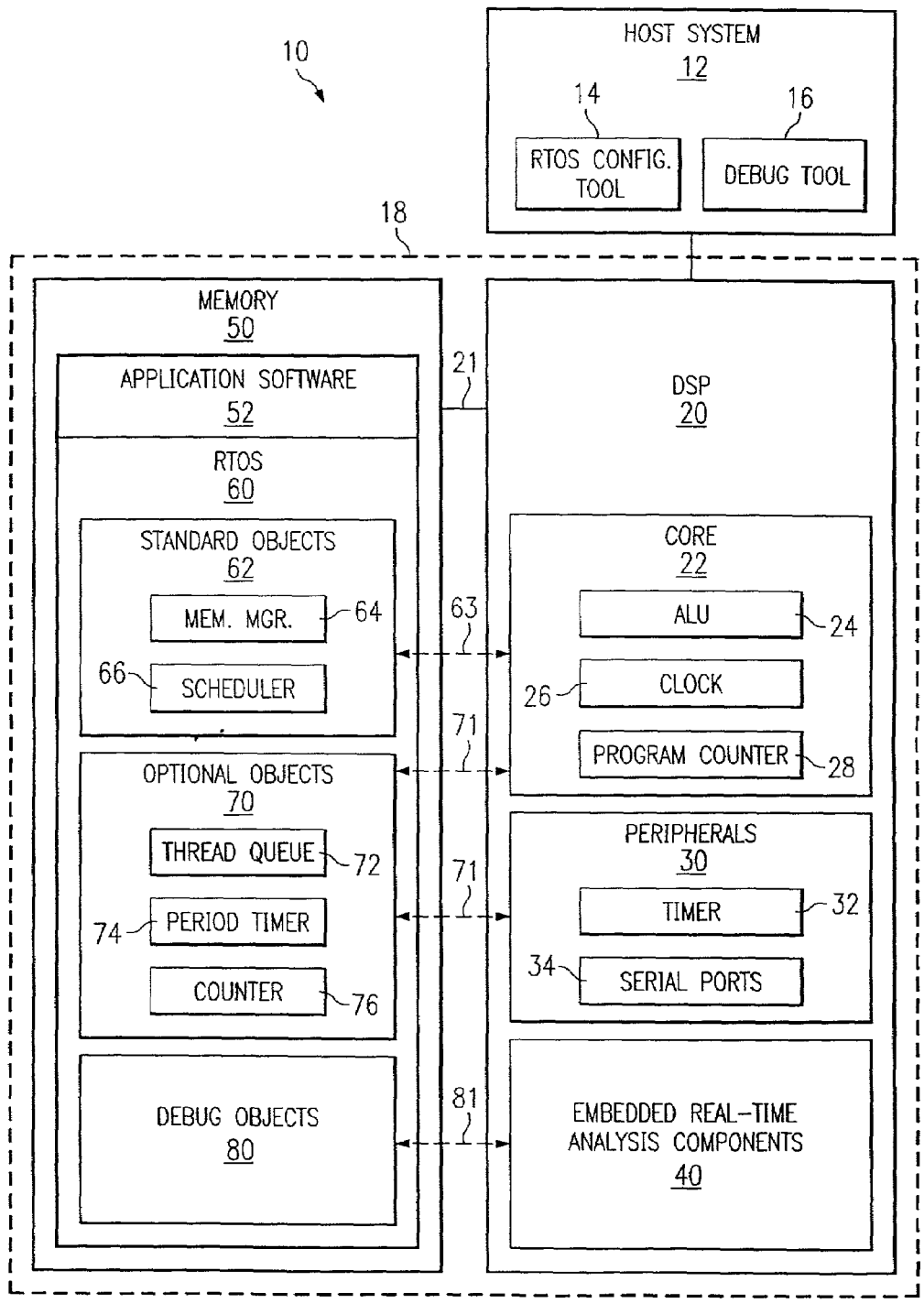
FIG. 1 is a block diagram of an example device with RTOS support for embedded real-time analysis components.

FIG. 1 shows an example development system 10 with a host system 12 connected to a data processing device 18. Host system 12, which may be a PC, is used to develop real-time applications or programs, such as application software 52, for data processing device 18. Accordingly, host system 12 includes a real-time application debug tool 16 for verifying proper operation and troubleshooting the hardware and software of data processing device 18.

In the example embodiment, data processing device 18 includes various hardware components, including a memory 50, a DSP 20, and a bus 21 that connects DSP 20 and memory 50. DSP 20 is an integrated circuit with many embedded modules, including a CPU core 22 with components such as a program counter 28, one or more arithmetic logic units (ALUs) 24, and one or more clocks 26. Various peripherals 30, such as timers 32 and serial ports 34, are also embedded in DSP 20. These peripherals could also include, but are not limited to, DMAs, Caches, Memory Interfaces, Man-Machine Interfaces, etc. Different DSPs have different peripherals, depending on the kinds of jobs to be handled by the DSPs. For instance, a DSP for a digital cellular telephone will generally have different peripherals than a DSP for imaging equipment.

In the example embodiment, data processing device 18 includes an RTOS 60 that supports application software 52, and application software 52 is a real-time program or application. Application software 52 may be in the debugging phase of development, as shown in FIG. 1, or it may actually deployed for use by end-users of data processing device 18. RTOS 60 and application software 52 execute out of memory 50.

In addition, host system 12 includes an RTOS configuration tool 14 which gives developers the ability to optimize RTOS 60 specifically for application software 52. For example, RTOS 60 may be optimized using the techniques described in U.S. Pat. No. 6,249,909, assigned to Texas Instruments Inc. Specifically, RTOS 60 is configured to minimize the space and time required by the OS, in consideration of the actual hardware features (e.g., peripherals) embedded in data processing device 18 and the software features required by application software 52.

In the example embodiment, RTOS 60 includes standard objects 62, which RTOS configuration tool 14 adds to all RTOSs. For example, a memory manager object 64 and a scheduler object 66 may be included as standard objects 62. As indicated by arrow 63, standard objects 62 respond to signals from DSP core 22.

RTOS configuration tool 14 also allows the developer to create optional objects 70, according to the needs of application software 52 and the hardware of DSP 20. For instance, the developer may create one or more thread queues 72, period timers 74, counters 76, etc., as optional objects 70. As indicated by arrows 71, optional objects 70 may respond to signals from DSP core 22 and peripherals 30.

Figure 2:
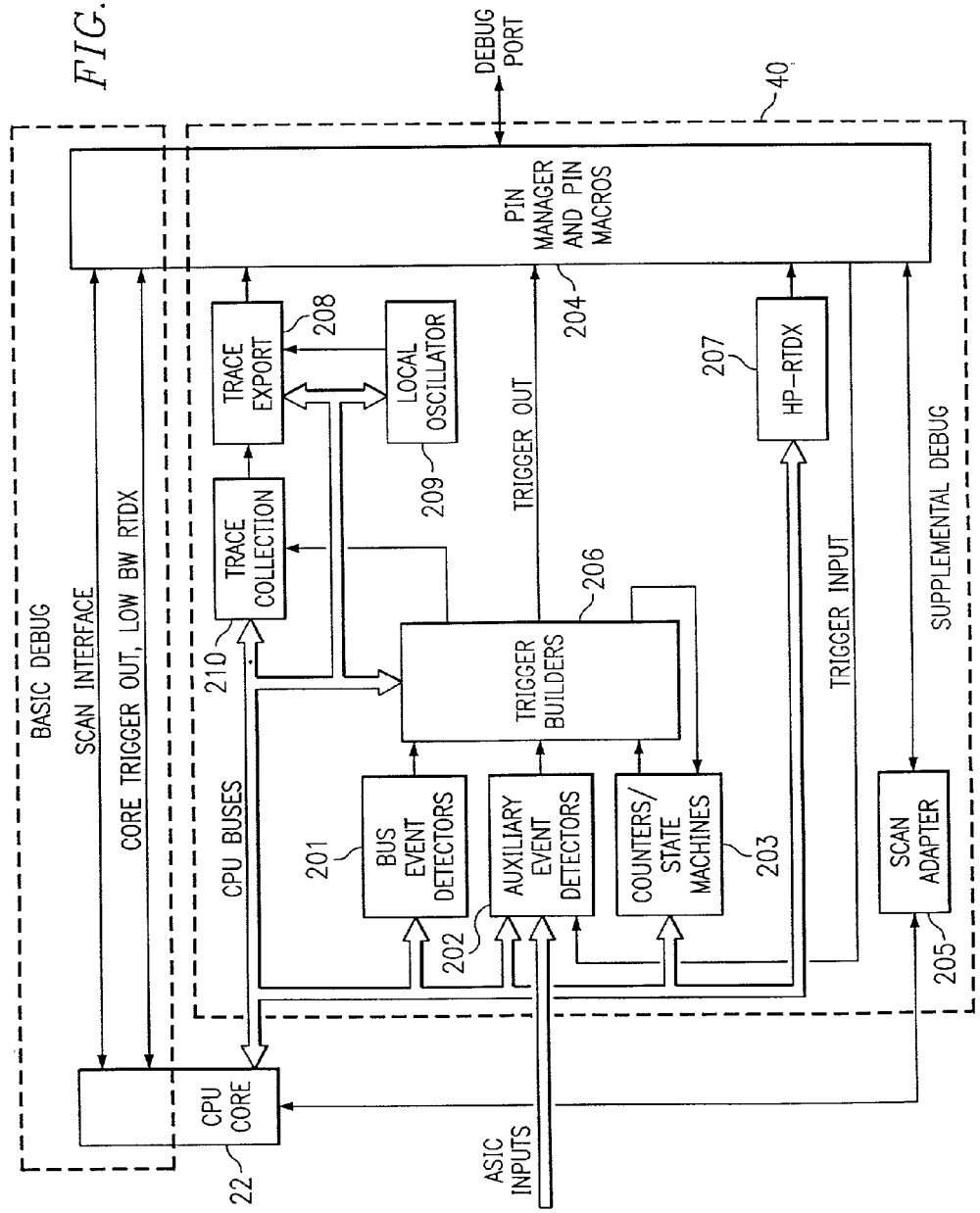
FIG. 2 is a block diagram of example embedded real-time analysis components and physical relationships between those components.

In the example embodiment, DSP 20 also includes embedded real-time analysis components 40 (also known as embedded debug components 40) which provide the advantages described above in the Background of the Invention. FIG. 2 presents one possible configuration of embedded debug components 40. These components include logic circuits that monitor activity, such as bus event detectors 201 and auxiliary event detectors 202. These components also include logic circuits that record activity, such as counters and state machines 203. Also included are logic circuits that permit pin sharing, such as a scan adapter 205 and a pin manager 204. In addition, these components include logic circuits that import and export data, such as a real-time data exchange (RTDX) component 207, and logic circuits that only export data, such as trace export components 208. Logic circuits that accelerate transmission, such as a local oscillator 209, and logic circuits that capture execution activity, such as a trace collection component 210 are also included, as are logic circuits that direct traffic, such as trigger builders 206.

Furthermore, RTOS configuration tool 14 has been enhanced to allow the developer to include software objects in the RTOS which use embedded debug components 40. Software objects which use embedded debug components are known in general as debug objects 80. As indicated by arrow 81 in FIG. 1, debug objects 80 respond to signals from embedded debug components 40.

FIG. 3 is a block diagram depicting example debug objects 80 in RTOS 60, example embedded debug components 40 in DSP 20, and example relationships between the debug objects and the embedded debug components. Embedded debug components 40 include a breakpoint module 102A, two sequence modules 102B and 102C, and a trace module 102D. In the example embodiment, the developer has used RTOS configuration tool 14 to customize RTOS 60 so that debug objects 80 include a breakpoint handler 112A, a sequence handler 112B, and a trace handler 112C.

Breakpoint module 102A uses various logic circuits, including a program flow trigger 206A from trigger builders 206 in FIG. 2. As described below, breakpoint module 102A automatically generates a breakpoint signal or action in response to particular program flow conditions. Sequence module 102B uses various logic circuits, including bus event detector 201 and a data flow trigger 206B from trigger builders 206. As described below, sequence module 102B generates a sequence signal or action in response to particular data flow conditions. Sequence module 102C uses logic circuits including a time trigger 206C from trigger builders 206. As described below, sequence module 102C generates a sequence signal or action in response to particular timing conditions. Trace module 102D uses logic circuits including trace collection circuit 210 and a cache-miss trigger 206D from trigger builders 206. In response to events such as cache misses, trace module 102D generates trace signals or actions, or trace module 102D enables or disables tracing.

Program flow trigger 206A, data flow trigger 206B, time trigger 206C, and cache-miss trigger 206D are known generally as embedded event trigger components. As will be appreciated by those of ordinary skill in the art, many other types of embedded event trigger components may be used in alternative embodiments. Likewise, breakpoint module 102A, sequence modules 102B and 102C, and trace module 102D are depicted for illustrative purposes only, and myriad other type of modules using many different kinds of comparators, counters, timers, etc., may be used in alternative embodiments.

As indicated by arrow 120, breakpoint handler 112A responds to the signals from breakpoint module 102A. Specifically, when the signals indicate that certain events have occurred in DSP 20, breakpoint handler 112A executes corresponding functions, such as a scheduling function 110A. For example, breakpoint module 102A may be configured to generate scheduling-error signals to recognize the loss of real-time deadlines. Such deadlines may relate to software threads that RTOS 60 has scheduled, for example by setting a flag in a mailbox, incrementing a counter, or writing to a scheduling register. When a thread is scheduled, if a previous request for service has not yet been completed, program flow trigger 206A causes breakpoint module 102A to assert a scheduling error or interrupt to indicate that a deadline was missed.

As indicated by arrow 120, breakpoint handler 112A detects the interrupt and, in response, executes a scheduling function 110A to respond appropriately, for example by asserting a system error to the user. Upon configuring the RTOS using the RTOS Configuration Tool 14 of FIG. 1, the user could program the desired actions in the event that a deadline is missed. This would allow a missed real-time deadline to gracefully exit the process if needed or re-schedule the event, instead of simply asserting some form of General Protection Fault.

Similarly, sequence module 102B may be configured to send overflow signals to recognize or anticipate events such as stack overflows. For example, bus event detector 201 may monitor write addresses and determine when the top of the stack is being written to, to determine when the user is getting critically close to overflowing the stack. When the top of the stack is written to, sequence module 102B creates an RTOS overflow interrupt. As indicated by arrow 122, event sequence handler 112B detects the interrupt. In response, event sequence handler 112B may execute an overflow function 110B that rejects requests to begin new software threads, dynamically allocates more stack memory, or kills the last thread started, for example.

Sequence module 102C may be configured to send priority signals in response to detecting that a thread timer has reached a critical level. For example, such a signal may be generated if a low priority thread that has not has been serviced is approaching a real-time deadline. When such a condition is detected, sequence module 102C may also dynamically raise the priority of the thread. As indicated by arrow 124, event sequence handler 112B detects the priority signal and, in response, executes a priority function 110C which ensures that the thread gets serviced before expiration of the real-time deadline.

In addition, trace module 102D may be configured to generate trace signals. As indicated by arrow 126, trace handler 112C detects the trace signals. In response, trace handler 112C executes corresponding functions, such as a trace function 110D. For example, if any of the aforementioned events or any similar events occurred, trace module 102D could be enabled to trace system program flow activity into a debug log. This action would then result in an alert to the user that a fault condition (or any condition for which the user should be notified) occurred, such that the user could view the system trace log or take the device to a service technician to have the system analyzed.

Referring now to FIG. 4, an example embodiment of a process for using embedded debug components 40 begins with data processing device 18 in an inactive or powered-down state. Then, in response to being powered on, data processing device 18 loads RTOS 60 into memory 50 and activates debug components 40, as indicated at blocks 200 and 202. This causes debug components 40 to initiate hardware-level monitoring of conditions in DSP 20, as described above. Data processing device 18 then loads application software 52 into memory and begins executing application software 52 using CPU core 22, as shown at block 204.

Then, as indicated at block 210, if breakpoint module 102A asserts a breakpoint signal or interrupt, the process passes to block 212, which shows breakpoint handler 112A responding to the breakpoint signal, for example by invoking scheduling function 110A, as described above.

After the breakpoint signal has been asserted, or if no breakpoint signal has been asserted, the process flows to block 220. As depicted at block 220, if sequence module 102B or 102C asserts a sequence signal or interrupt, the process passes to block 222, which shows event sequence handler 112B responding to the sequence signal, for example by invoking overflow function 110B or priority function 110C, as described above.

After the sequence signal has been asserted, or if no sequence signal has been asserted, the process flows to block 230: Then, if trace module 102D asserts a trace signal or interrupt, trace handler 112C responds to the trace signal, for example by invoking trace function 110D, as described above. The process then returns to block 210, with application software 52 continuing to run, debug components 40 continuing to monitor conditions and generate signals accordingly, and debug objects 80 continuing to respond to those signals.

As has been described, the example embodiment features a DSP with embedded real-time analysis components and an RTOS with software objects that use those embedded real-time analysis components. Since the breakpoint signals, overflow signals, etc. from the embedded real-time analysis components are generated using hardware, the generation process imposes no software cost to the application software. Furthermore, the signals are generated more rapidly than in DSPs that use software to monitor conditions such as those described above. Moreover, since the RTOS includes objects for handling the above signals, the application software may be designed to take advantage of the capabilities provided by the debug components.

OTHER EMBODIMENTS

Although the invention has been described with reference to one or more example embodiments, it should be understood that various changes and substitutions can be made without departing from the spirit and scope of the invention. For example, although the memory is implemented as a separate integrated circuit in the example embodiment, alternative embodiments may feature different memory architectures, including architectures with multiple memory modules and architectures with one or more memory modules embedded in the DSP. Similarly, in alternative embodiments, many different types of circuits and many different combinations thereof may be used to implement many different kinds of debug components. The invention is therefore not limited to the example embodiment, but is defined by the following claims.

What is claimed is:

1. A method in a data processing system for real-time analysis of operations of a processor in the data processing system, the method comprising the steps of:

disposing real-time analysis hardware components within the processor operable to detect real-time events within the processor and activate;

initiating a real-time operating system (RTOS) in the data processing system, initiating the RTOS including loading software objects corresponding to embedded real-time analysis components expected to be activated by a real-time application;

executing the real-time application in the data processing system, such that execution of the real-time application triggers at least one real-time event that causes one or more of the embedded real-time analysis hardware components of the processor to detect said real-time event and activate; and in response to an activation signal from the one or more embedded real-time analysis hardware components, activating a software object in the RTOS associated with the one or more embedded real-time analysis hardware components, such that the software object provides functionality in response to activation of the one or more embedded real-time analysis hardware components.

2. The method of claim 1, wherein:

said step of disposing real-time analysis hardware components within the processor includes disposing a real-time event trigger hardware component operable to generate a signal corresponding to the detected real-time event;

said step of activating a software object in the RTOS comprises activating a debug object in the RTOS that responds to signals from a corresponding embedded event trigger hardware component among the one or more embedded real-time analysis hardware components.

3. The method of claim 2, wherein:

the one or more real-time analysis hardware components within the processor includes an embedded program flow event trigger hardware component generating signals related to program flow; and the debug object responds to signals relating to program flow from the embedded program flow event trigger hardware component.

4. The method of claim 2, wherein:

the one or more real-time analysis hardware components includes an embedded data flow event trigger hardware component generating signals related to data flow; and the debug object responds to signals relating to data flow from the embedded data flow event hardware trigger component.

5. The method of claim 2, wherein:

the one or more real-time analysis hardware components includes an embedded cache miss event trigger hardware component generating signals related to cache misses; and the debug object responds to signals relating to a cache miss from the embedded cache miss event trigger hardware component.

6. The method of claim 2, wherein:

the one or more embedded real-time analysis hardware components includes an embedded breakpoint event trigger hardware component generating signals related to a breakpoint, an embedded trace handler event trigger hardware component generating signals related to trace handling and an embedded event sequence handler trigger hardware component generating signals related to an event sequence; and the operation of activating the debug object comprises activating an object selected from the group consisting of:

a breakpoint handler;

a trace handler; and an event sequence handler.

7. The method of claim 1, further comprising the step of:

using the one or more embedded real-time analysis hardware components to provide functionality during end-user operation of the real-time application.

8. The method of claim 7, wherein the functionality provided during end-user operation of the real-time application comprises a function selected from the group consisting of:

stack overflow detection;

real-time task priority modification; and system scheduling error assertion.

9. The method of claim 1, wherein:

said step of loading software objects corresponding to embedded real-time analysis hardware components expected to be activated by said real-time application includes loading at least one standard software object, and selectively loading at least one optional software object corresponding to embedded real-time analysis hardware components expected to be activated by said real-time application.

10. The method of claim 1, wherein:

said step of loading software objects corresponding to embedded real-time analysis hardware components expected to be activated by said real-time application occurs upon initial application of electric power to the data processing system.

11. The method of claim 1, wherein:

said step of loading software objects corresponding to embedded real-time analysis hardware components expected to be activated by said real-time application attempts to minimize resources required by the RTOS in consideration of hardware features embedded in the data processing system and the software features required by the real-time application.

* * * * *